April 4, 1961  N. F. KRUSE  2,978,326
THERMAL PRESSURE PREPARATION OF HIGH FAT MEAL
Filed April 19, 1957
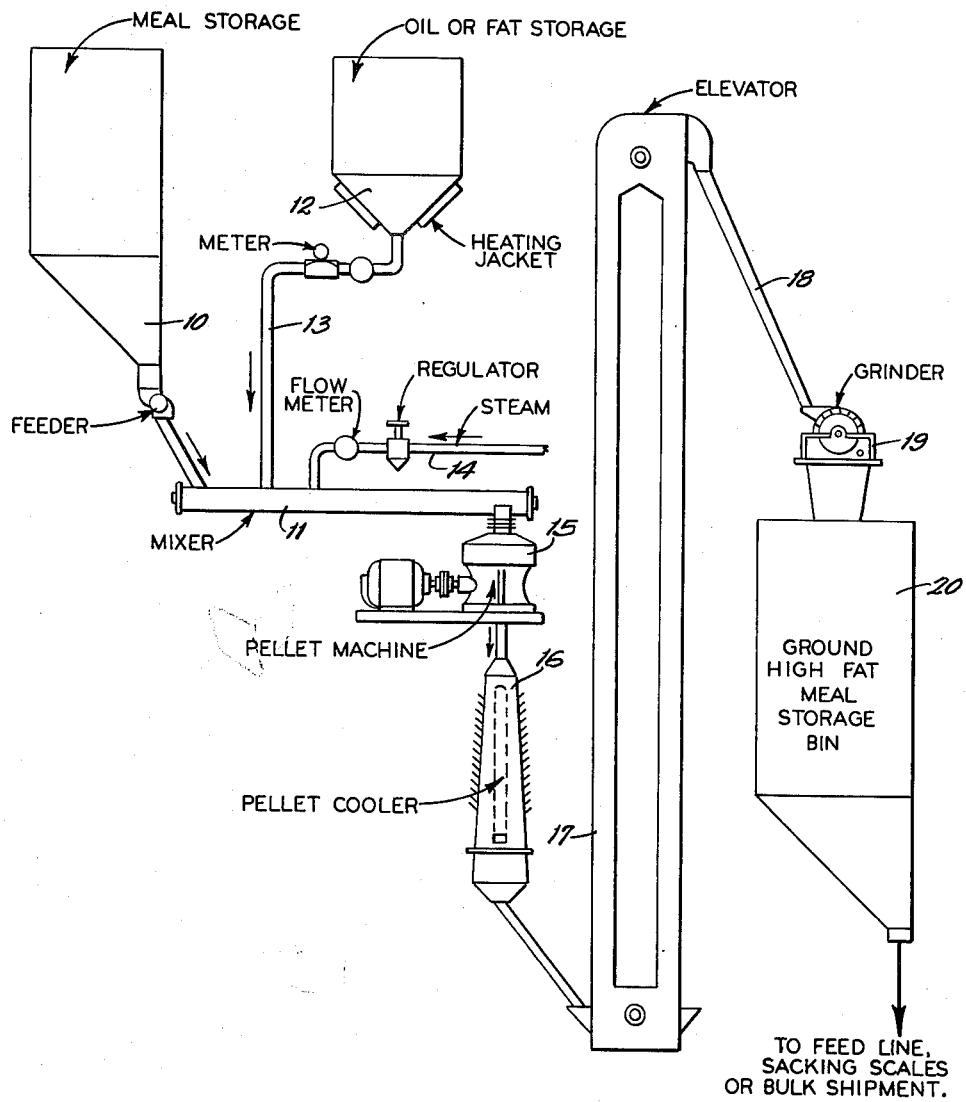
INVENTOR:
Norman P. Kruse,
BY Dawson, Tilton, Fallon + Lungmus,
ATTORNEYS.

United States Patent Office 2,978,326
Patented Apr. 4, 1961

2,978,326
THERMAL PRESSURE PREPARATION OF HIGH FAT MEAL

Norman F. Kruse, Decatur, Ind., assignor to Central Soya Company, Inc., Fort Wayne, Ind., a corporation of Indiana Filed Apr. 19, 1957, Ser. No. 653,862
6 Claims. (Cl. 99—2)

This invention relates to a thermal pressure preparation of high fat meal, and more particularly to the production of high fat content oilseed meal having excellent nutritional qualities while at the same time possessing excellent handling, shipping and binning properties.

It has been recently desired to add fat in substantial quantities to oilseed meals, the fat being useful in the stock and poultry feeding rations as an economical source of energy. Limited success has been achieved because the added fat remains on the surface of the meal and has a tendency to bleed in the paper or cloth packages, and to become rancid, with corresponding deterioration of vitamin characteristics. Further, the meal loses its free flowing and handling properties, and it is difficult to get the meal out of bins or other storage containers. Also, where the added fat tends to remain on the surface of the product, the product has a greasy or oily appearance and, as stated above, the fat tends to bleed into the paper or cloth containers and the meal has poor handling and flow properties. As a consequence, the practice has been to add only small amounts of fat, and while such fat contributes toward reducing the dust in the feed and adding somewhat to palatability, this seems to have been the extent of usefulness.

The problem is even more difficult where the meal has been desolventized and finished and where it is desired to incorporate in the finished meal a high level of fat. It is even more difficult to incorporate in such finished meal substantial amounts of fat while providing a meal of good handling and flow properties.

I believe that no one has succeeded in incorporating in such feeds high levels of fat providing substantial nutritional value, the fat existing within the meal in a "bound" form so that the resulting product is dry in texture, having substantially no tendency to bleed into the paper or cloth package, and having flow and handling properties similar to those of regular oilseed meals.

An object of the present invention is to provide an oilseed meal having a high level of fat content while at the same time having good flow and handling properties, good keeping qualities, and no tendency to bleed into the container material. A further object is to provide a method and means whereby a desolventized or finished meal is effectively treated for the incorporation of high levels of fat therein while at the same time providing a free-flowing and relatively dry-surfaced product. A further object is to provide a high fat content oil seed meal wherein the fat is incorporated within the interior of the meal particles and the resulting product, in pellet, chip, or ground form, has a relatively dry and non-bleeding exterior surface with no change in nutritional value of the base meal in the process. Yet another object is to provide a soybean oil meal having a fat content in excess of 10% while at the same time having good keeping qualities, a dry texture, good flow and handling properties, and no tendency to bleed into the paper or cloth packages, etc. Other specific objects and advantages will appear as the specification proceeds.

The invention may be carried out in various forms of apparatus. One embodiment of the invention may be practiced in the apparatus shown in the accompanying drawing, in which the apparatus is shown in a schematic arrangement.

While the process is applicable to oilseed meals in general, the process and apparatus will be described herein in connection with the treatment of soybean flakes, and more particularly in connection with soybean flakes which have been extracted and desolventized or extracted, desolventized and toasted.

In the illustration given, desolventized or toasted soybean flakes are fed from the storage 10 to a mixer 11, preferably equipped with rotating paddles. Oil or fat from a storage vessel 12 is fed through the line 13 into the mixer. Optionally, steam from a line 14 may also be introduced into the mixer. The mixed mass is discharged into a pellet machine 15; the material is extruded under high pressure and temperature and then passed into a pellet cooler 16. From the pellet cooler 16, the pellets, chips, or other form of material is discharged into an elevator 17, and from there directed through channel 18 into the grinder 19. From the grinder the material passes into a storage bin 20 and from thence to a feed line, sacking scales, or to bulk shipment storage.

In the foregoing process, I add mechanical energy to force the fat into the meal, employing only the necessary elements of heat and pressure. The meal need contain no solvent, and it is not necessary that steam be introduced into the material. Instead of a pelleting machine, other mechanical devices for compressing the material under relatively high temperatures may be employed; for example, an expeller equipped with a solid barrel instead of drainage bars may be used to force the fat into the meal under pressure. I prefer to employ the pellet machine because of its rapid action and because the fat seems to flow under the mechanical energy impressed upon it into the interior of the pellets so that when the pellets are later ground to form a meal, the meal has relatively dry exterior surfaces and is free-flowing and readily handled. Other types of pressure apparatus may also be used such as an extruder fitted with a heated or unheated barrel chamber.

I prefer to employ in the pelleting operation or the heat and pressure operation, temperatures ranging between 150 and 250° F., and best results have been obtained in temperatures of 175 to 215° F. I prefer to employ pressures between 1,000 and 10,000 lbs. per square inch. It will be understood that the pressures and temperatures may vary substantially, depending upon the material being treated, the amount of fat to be incorporated into the material, and other conditions.

As stated, the product may be discharged in the form of a pellet or in the form of chips or any other shaped pieces, and the product may be used in the form of the discharged piece or ground to form a meal product. In any of these forms, it is found that the product has a relatively dry exterior surface and can be readily handled in bins and other storage containers.

While I am not able to determine with finality the reason why the high level of fat is forced into the meal so as to leave relatively dry exterior surfaces, I believe that the new result may be attributed to the combination of repeated applications of mechanical pressure or energy and heat. As stated, the process is effective upon meal which contains substantially no solvent and which may be toasted or in a finished condition.

Specific examples of the process may be set out as follows:

*Example I*

Desolventized and toasted soybean meal was mixed with tallow at a rate of 4,000 lbs. of mix per hour, to bring the fat content to approximately 20%. 200 lbs. of steam per hour were added. The material was passed through a California pellet machine, using a thick 12/64 die. The oily mixture was formed in the pellet machine into hard pellets, which were cooled and then ground. A free-flowing, high fat content meal was obtained which could be readily handled in a storage bin, which had good keeping qualities, and which did not tend to bleed into paper sacks into which the material was filled.

*Example II*

The process was carried out as described in Example I except that 900 lbs. of steam per hour were added to the wet mix fed into the pellet machine, and a free-flowing, satisfactory product was produced after pelleting and grinding.

*Example III*

The process was carried out as described in Example I, except that no steam was added, thus using frictional heat only. A product comparable to that obtained in Example I was obtained.

*Example IV*

The process was carried out as described in Example I, except that sufficient yellow grease was added to bring the content up to 35%. The product obtained was comparable to that described in Example I.

*Example V*

Desolventized and toasted soybean meal was mixed with 12% of a blend of yellow grease and tallow and passed through an expeller fitted with a solid barrel, 150 lbs. of steam pressure being maintained on the jackets of the expeller tempering apparatus. The feed was in tempering for 3¾ minutes. The temperature of the caked product as extruded was 210-215° F. and the rate from the expeller was 1350 lbs. per hour. The final product, after grinding, was dry and free flowing and it was found that the fat was bound into the meal, having no tendency to bleed into the paper or cloth containers.

*Example VI*

The process was carried out as described in Example I, except that corn germ meal was substituted for the soybean meal, the meal being substantially free of solvent. The finished meal particle was permeated with fat, containing substantially 20% of fat, while the exterior surface the meal particles had a dry texture and substantially no tendency to bleed into paper or cloth containers.

*Example VII*

Extracted peanut meal from which the hexane solvent was removed, was treated with 18% tallow and the oily mixture was fed into a pelleting machine to reach a temperature of approximately 215° F., the pressure being in the neighborhood of 5,000 lbs. A dry meal product in which the fat was bound within the particles was obtained after grinding the pellets, and there was no tendency for the fat to bleed into container packages when the material was packed.

Like processes were carried on with linseed meal, copra meal, and cottonseed meal, and a dry, free-flowing product having bound fat therein substantially in excess of 10%, was obtained.

In the foregoing processes, best results seem to be obtained where the fat was added just before the material entered the pellet machine, and the fat was effectively incorporated in the meal even though the meal contained substantially no solvent and was toasted or finished.

While, in the foregoing specification, I have described a product and procedure for preparing it in considerable detail for the purpose of illustrating the invention, it will be understood that such details may be varied widely by those skilled in the art without departing from the spirit of my invention.

I claim:

1. In a process for preparing a high-fat-content, free flowing, dry oilseed meal, the steps of mixing an oilseed meal with more than 10% of fat at a temperature at which the fat is liquid, extruding the meal under heat and pressure in excess of 1,000 lbs. per square inch to force the liquid fat into extruded hard pieces having dry exterior surfaces, and cooling said pieces.

2. The process of claim 1 in which said extruded meal pieces are ground to form a free flowing meal.

3. The process of claim 1 in which steam is introduced into the meal during mixing.

4. In a process for preparing a high-fat-content, free-flowing, dry oilseed meal product, the steps of mixing an oilseed meal with more than 10% liquid fat, and subjecting the mixed mass to pressures between 1,000 and 10,000 pounds per square inch to force the fat into the interior of the meal so that the meal particles have dry exterior surfaces.

5. The process of claim 4 in which the meal is soybean meal substantially free of solvent and toasted.

6. A process for preparing a high-fat-content, free flowing, dry oilseed meal, comprising mixing soybean meal within excess of 10% liquid fat and in the presence of steam, and extruding the meal under a temperature of 150-250° F. and under pressures between 1,000 and 10,000 pounds per square inch to force the liquid fat into extruded hard pieces having dry exterior surfaces, cooling said pieces, and grinding said pieces to form free flowing meal.

References Cited in the file of this patent

UNITED STATES PATENTS

| | | |
|---|---|---|
| 2,168,532 | McMath et al. | Aug. 8, 1939 |
| 2,786,760 | Bonnafoux | Mar. 26, 1957 |
| 2,835,584 | Rosenberg | May 20, 1958 |
| 2,928,737 | Fincher | Mar. 15, 1960 |

OTHER REFERENCES

Kraybill-American Meat Inst. Circular 7, April 1953, Chicago, Ill., pages 5, 9 and 10.